United States Patent
Freyermuth

[15] 3,669,979
[45] June 13, 1972

[54] NOVEL PROCESS FOR THE PRODUCTION OF 2-BENZOTHIAZOLYL-PHENOL AND DERIVATIVES THEREOF EMPLOYING PHOSPHORUS TRICHLORIDE AS A CATALYST

[72] Inventor: Harlan B. Freyermuth, Easton, Pa.
[73] Assignee: GAF Corporation, New York, N.Y.
[22] Filed: Dec. 14, 1967
[21] Appl. No.: 690,376

[52] U.S. Cl. .................260/304, 260/307 D, 260/309.2, 260/515 R, 260/515 A, 260/521 R, 260/575, 260/578
[51] Int. Cl. ..............C07d 91/44, C07d 85/48, C07d 49/38
[58] Field of Search ..........................260/304, 307.4, 309.2

[56] References Cited

UNITED STATES PATENTS 2,985,661  5/1961  Hein et al. .............................260/304

OTHER PUBLICATIONS

Grimmel et al., Chem. Abstracts, 40:3457 (1946)

Primary Examiner—Alex Mazel
Assistant Examiner—R. J. Gallagher
Attorney—George L. Tone, Walter C. Kehm, Homer J. Bridger, Samson B. Leavitt and Martin A. Levitin

[57] ABSTRACT

A method of preparing heterocyclic derivatives selected from the formulae:

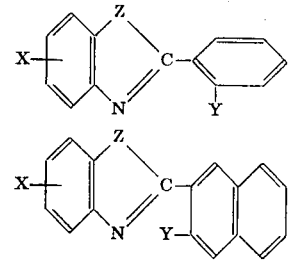

wherein X is selected from hydrogen, lower alkyl, lower alkoxy, and halogen; Y is selected from hydroxy and X; Z is selected from nitrogen, oxygen, and sulfur by reacting an o-aminobenzenethiol, o-aminophenol, or o- aminoaniline and substituted derivatives thereof with an ortho-substituted benzoic acid or 2-substituted naphtholic acid in the presence of a catalyst comprising phosphorus trichloride. The compounds produced by the process of the present invention are useful as stabilizers in various organic media, e.g., organic plastics, oils, etc. and as intermediates in the production of dyestuffs and fluorescent compounds.

6 Claims, No Drawings

NOVEL PROCESS FOR THE PRODUCTION OF 2-BENZOTHIAZOLYL-PHENOL AND DERIVATIVES THEREOF EMPLOYING PHOSPHORUS TRICHLORIDE AS A CATALYST

The present invention is directed to a novel process for the preparation of certain heterocyclic derivatives, and more particularly, to an improved process of producing certain heterocyclic derivatives in high yield by the use of a phosphazo reaction employing as the catalyst phosphorus trichloride The heterocyclic derivatives that are produced in accordance with the novel process of the present invention have been known in the prior art and have been prepared by various methods. Thus, in the Journal of Organic Chemistry, Volume 18, Pages 422–425(1953), it is reported by Robert G. Charles and Henry Freiser that 2-benzothiazolyphenol can be produced by condensing salicylic acid and o-aminobenzenethiol. The structure of the compound having a melting point of 132°–133° C was proved by studying the ultraviolet absorption spectra of the product that was prepared.

While such a procedure outlined by Charles and Freiser is effective to produce the desired 2-benzothiazolyphenol, the procedure set forth and described in the literature produced a product of poor yield after distillation of black-colored reaction mixture. Thus, it is reported that yields of only about 47 percent were produced by this prior art method. Similar procedures for the production of analogous compounds have also proven to be unsatisfactory, both from the standpoint of yield of product and purity of the product that is produced.

Accordingly, it has long been the desire of the industry to provide a new process for the production of certain heterocyclic derivatives which process could be effective to produce such derivatives in high yield and in high purity. Particularly, it has been the desire of the industry to provide a new process for the production of the valuable product 2-benzothiazolyphenol, which new process would eliminate the inherent deficiencies of the prior art process described in the literature.

In accordance with the present invention, however, it has now been discovered that by employing the particular process of the present invention, wherein a phosphazo reaction is conducted by the employment of phosphorus trichloride as a catalyst, it is possible to produce certain heterocyclic derivatives in yields of approximately 90 percent. Additionally, it has been discovered in accordance with the present invention that it is possible to produce 2-benzothiazolylphenol in yields of substantially 90 percent by the reaction of o-aminobenzenethiol and salicylic acid in a phosphazo reaction employing phosphorus trichloride as a catalyst.

Accordingly, it is a principal object of the present invention to provide a novel process for the production of certain heterocyclic derivatives, which process eliminates the inherent deficiencies of prior known processes.

It is a further object of the present invention to provide such a novel process for the production of certain heterocyclic derivatives wherein a phosphazo reaction is conducted employing phosphorus trichloride as the catalyst.

A still further object of the present invention is to provide a novel process for the production of certain heterocyclic derivatives wherein yields of approximately 90 percent can be obtained by employing a catalyst comprising phosphorus trichloride.

A still further object of the present invention is to provide a novel process for the production of 2-benzothiazolylphenol by the reaction of o-aminobenzenethiol and salicylic acid in a phosphazo reaction employing a catalyst comprising phosphorus trichloride.

Still further objects and advantages of the novel process of the present invention will become more apparent from the following more detailed description thereof.

The present invention relates to the production of certain heterocyclic derivatives of the following structural formulas.

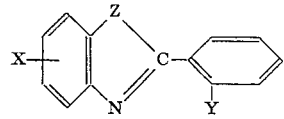

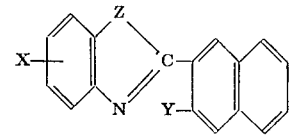

wherein X is selected from hydrogen, lower alkyl, e.g., methyl, ethyl, n-propyl, isopropyl, n-butyl, t-butyl, n-amyl, iso-amyl, etc., lower alkoxy, e.g., methoxy, ethoxy, n-propoxy, isopropoxy, n-butoxy, t-butoxy, etc., and halogen, e.g., chlorine, bromine, iodine, etc.; Y is selected from hydroxy and X; and Z is selected from nitrogen, oxygen, and sulfur.

Such compounds are prepared by condensing an o-aminobenzenethiol, o-aminophenol, o-aminoaniline, or substituted derivatives thereof with an o-substituted benzoic acid or 2-substituted naphtholic acid. The process of the present invention is particularly suitable for the production of 2-benzothiazolylphenol by the condensation of o-aminobenzenethiol and salicylic acid.

Exemplary o-aminobenzenethiols, o-aminophenols, and o-aminoanilines suitably employed in the condensation reaction of the present invention are:

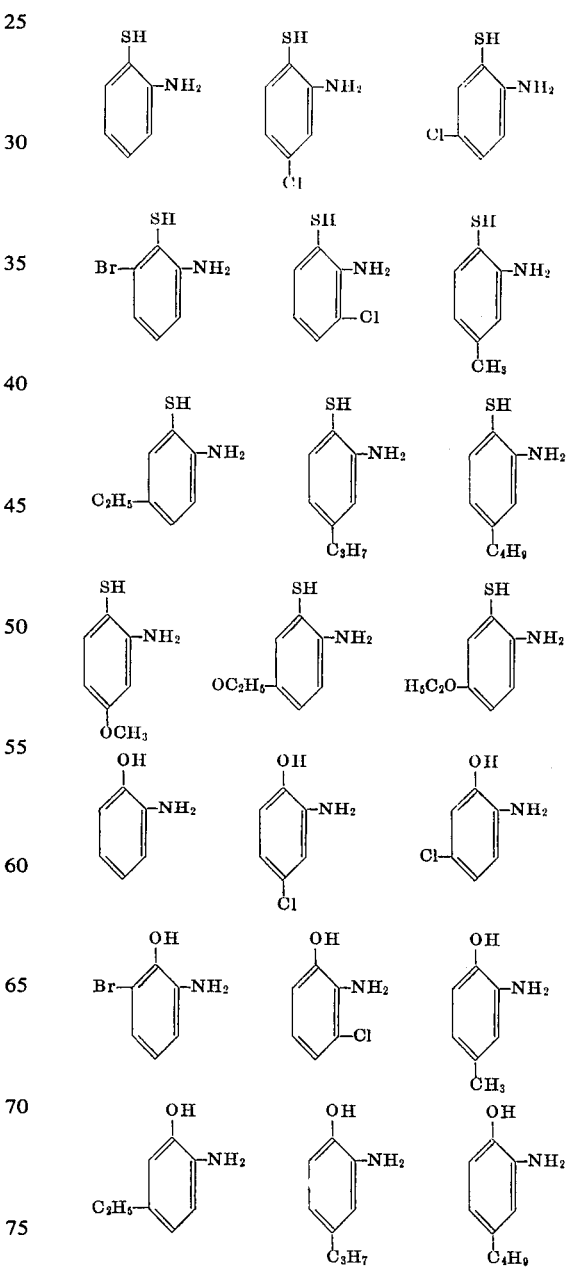

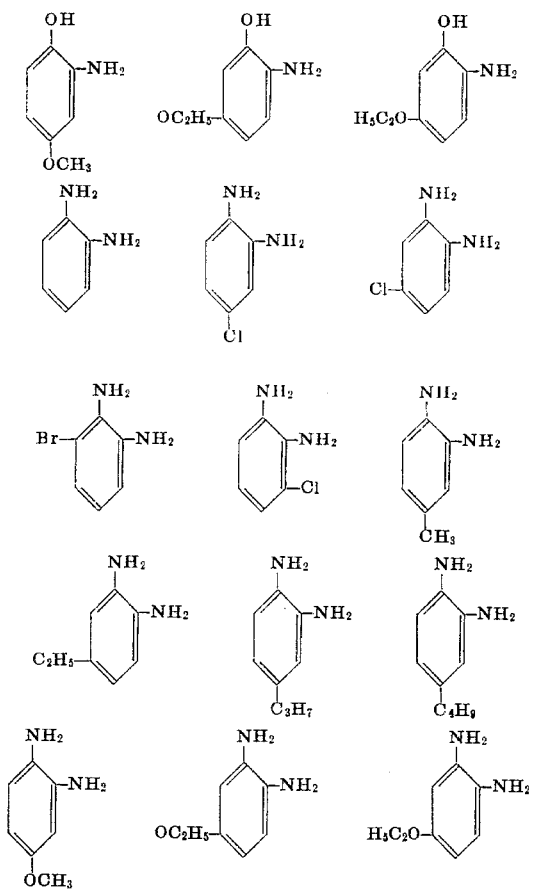

Similarly, exemplary benzoic and naphtholic acid derivatives suitably employed in the phosphazo condensation process of the present invention include:

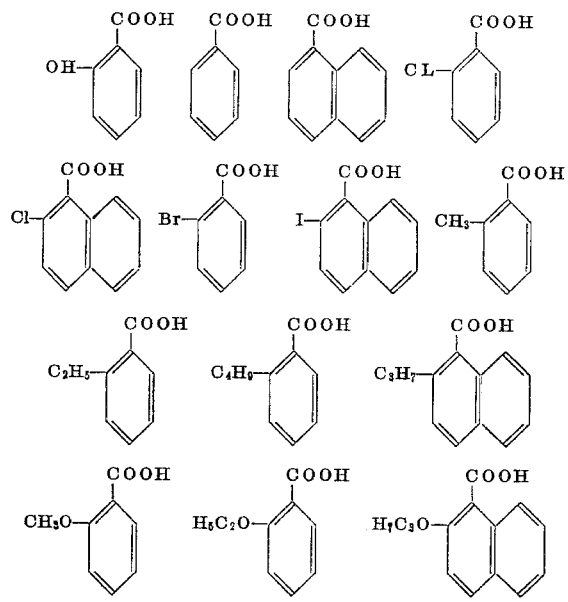

Since the process of the present invention is particularly suitable for the preparation of 2-benzothiazolylphenol by the condensation of o-aminobenzenethiol and salicylic acid, the process of the present invention will now be further described primarily with reference to the production of this product.

As noted above, the process of the present invention comprises a phosphazo reaction wherein the 2-aminobenzenethiol or analogous material is condensed with salicylic acid or analogous material in the presence of phosphorus trichloride. While not wishing to be bound by any particular theory, it is hypothesized that the aromatic amine first reacts with the phosphorus trichloride to form a phosphazo intermediate which intermediate subsequently reacts with the aromatic carboxylic acid to produce the anilide. In the case of 2-aminobenzenethiol and salicylic acid to produce 2-benzothiazolylphenyl, it is hypothesized that spontaneous cyclization occurs in the acidic media after or simultaneous with the anilide formation.

The phosphazo reaction with the present invention is generally carried out in the presence of an organic solvent. Generally, the solvent that is employed is one selected from organic aromatic hydrocarbons and organic aromatic amines. Exemplary organic aromatic hydrocarbons include, for example, benzene, toluene, ortho-, meta-, and para-xylene, etc. Similarly, exemplary aromatic amine solvents which can be employed in the phosphazo reaction of the present invention include, for example, aniline, mono-lower alkyl substituted derivatives of aniline, and di-lower alkyl substituted derivatives, e.g., dimethylaniline.

The organic aromatic hydrocarbon solvents, particularly toluene, are the preferred solvents in accordance with the process of the present invention. Thus, it has been found that the employment of such aromatic hydrocarbon solvents produces a slightly higher yield of desired heterocylic derivative than is obtained by the employment of the organic aromatic amine.

The amount of solvent employed in the reaction system in accordance with the present invention is not in any way critical. Accordingly, great excesses of solvent in the system in no way interfere with the reaction taking place and in no way adversely affect the yield or purity of the product. The solvent that is employed in the system is merely removed from the reaction system after completion of the reaction by conventional solvent removal systems.

The process of the present invention is generally carried out in two stages or steps. The first step in the reaction of 2-aminobenzenethiol or an analogous material and phosphorus trichloride is exothermic and is generally carried out at a temperature of from about 40° to 80° C, preferably about 60° C with external cooling. In this step, the phosphazo intermediate is prepared by the reaction of phosphorus trichloride with the 2-aminobenzenethiol or analogous material. The second step of stage between such phosphazo intermediate and the salicylic acid or analogous material is generally carried out at an elevated temperature of from about 90° to 120° C, preferably from about 105° to 110° C. This temperature is very near the boiling point of toluene and thus, reflux conditions can be utilized.

It has been found that by carrying out both steps at an elevated temperature an inferior product in low yield is produced. The process of the present invention can be carried out either by employing a single reaction vessel initially kept at approximately 40° to 80° C with subsequent raising of the temperature of reaction to the higher temperature of 90° to 120° C or can be conducted in two separate reaction vessels, wherein the product of the first reaction conducted at the lower temperature is completely removed and passed into the second vessel at a higher temperature in order to conduct the second step or stage of the reaction.

While the two reactants in the novel process of the present invention react in substantially stoichiometric amounts it has not been found disadvantageous to employ an excess of either the reactants. Thus, the employment of a stoichiometric excess of either of the reactants does not adversely affect the purity or yield of the reaction product, it only being necessary to remove excess reactant after the completion of the reaction. This again can be accomplished in any conventional manner. For purposes of economics, however, it is preferred to employ substantially stoichiometric amounts of the reactants.

As noted above, the phosphazo reaction of the present invention is accomplished in the presence of a catalyst comprising phosphorus trichloride. The amount of phosphorus trichloride catalyst that is employed in the reaction process of the present invention generally varies from about 0.5 to 2 moles of phosphorus trichloride per mole of 2-aminobenzenethiol or analogous reactant. Preferably, the phosphorus trichloride catalyst and 2-aminobenzenethiol or analogous reactant are employed in substantially equi-molar amounts. It is, of course, obvious that lesser or greater amounts of the catalyst material can be employed where desired for specific purposes.

The following compounds are representative of those which are produced by the novel phosphazo reaction of the present invention:

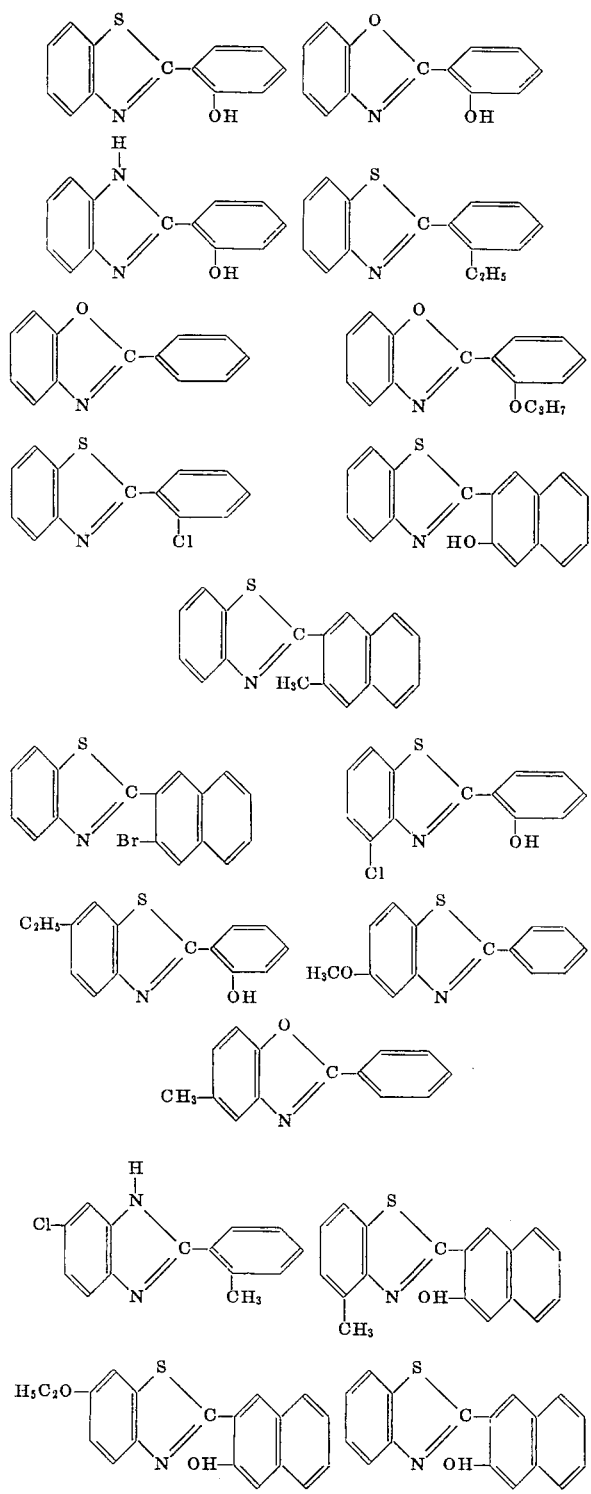

The following specific examples illustrate various embodiments of the present invention. It is to be understood, however, that such examples are presented for purposes of illustration only, and the novel process of the present invention is in no way to be deemed as limited thereby.

EXAMPLE 1

A 50 liter flask having a multi-neck entrance attachment was equipped with an air driven stirrer, thermometer, condenser, hydrogen chloride, scrubber, "cold finger" (made from a 28 mm. diameter and 32 inch long glass tube which had been sealed at one end), a 1 liter dropping funnel and an electric heating mantle. To this flask was charged 18.75 liters toluene, 2,070 g. (15 moles) salicylic acid and 1,875 g. (15 moles) aminobenzenethiol. The "cold finger" was filled with acetone to the liquid level of the flask. During an hour and twenty minutes. 1,695 g. of phosphorus trichloride was added by means of the dropping funnel. Small pieces of dry ice were continually added to the cold finger to absorb some of the heat from the exothermic reaction. The temperature was allowed to slowly climb to 43° C during the addition period. The creamy white slurry of the phosphazo addition was slowly heated by the electrical heating mantle. At 90° – 95° C, hydrogen chloride began to evolve rapidly and some slight flooding of the condenser occurred. The slight flooding subsided at 107° C and the temperature was raised to the reflux (111° C) for 4 hours after which time, the evolution of hydrogen chloride has subsided. The reaction was allowed to cool over night and the following morning, 8 liters of 20 percent weight/volume sodium carbonate were gradually added through a dropping funnel to neutralize all the acid and make the reaction mixture slightly alkaline (pH 8.9). The toluene was steam distilled from the reaction mixture (16 liters was collected). Upon cooling, the tan or light colored product was filtered on a large ceramic filter The wet cake (5,170 g.) was placed in glass trays and dried over night in vacuum ovens at 60° C. The dried product (3,190 g.) melted at 129°–133° C and the yield was over 90 percent of theoretical. The product corresponded to the formula:

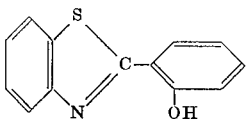

EXAMPLE 2

A 1 liter three-neck flask equipped with a stirrer, thermometer, a Thermo-Watch temperature controller and an electric heating mantle was charged with 55.2 g. (0.4 mole) salicylic acid, 121 g. (130 ml.) dimethylaniline (1.0 mole), and 50.0 g. (43 ml.; 0.4 mole) 2-aminobenzenthiol. The mixture was warmed to 60° C with continual agitation and 45.2 g. (29.2 ml.; 0.33 mole) phosphorus trichloride was added dropwise by means of a separatory funnel during 40 minutes. The temperature was maintained at 60° C for seven hours, whereupon the mixture was cooled to room temperature and 400 ml. water and 30 ml. concentrated hydrochloric acid were added. The mixture was stirred over night and the precipitated product was filtered on a Buchner funnel. The wet cake was dried in a vacuum oven. The 2-benzothiazolylphenol weighed 81,3 g. and melted at 130°– 132° C. The yield was 89 percent of theory.

EXAMPLE 3

In the manner described in Example 1, approximately stoichiometric amounts of the following reactants were condensed to produce the corresponding heterocyclic derivative using phosphorus trichloride as the catalyst. In all cases, a yield of approximately 90 percent of the desired product was obtained.

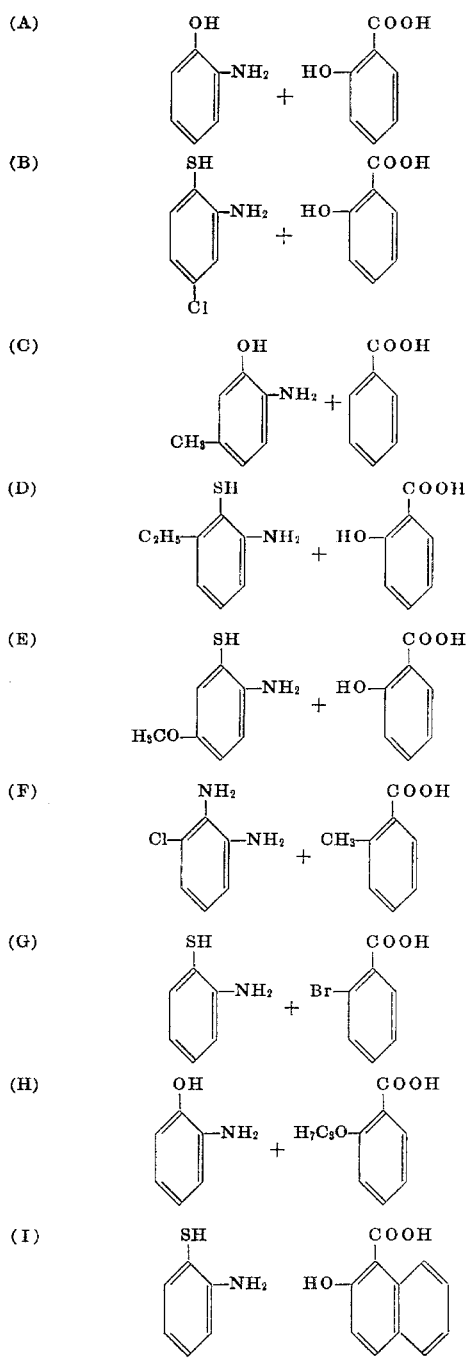

The compounds produced in accordance with the process of the present invention are useful as stabilizers in various organic media, e.g., organic plastics, oils, etc., and as intermediates in the production of dyestuffs and fluorescent compounds. Thus, reference is made to my co-pending application in which 2-benzothiazolylphenol is employed as a starting material in the production of a highly fluorescent dyestuff.

While various embodiments of the present invention have been described with reference to the specific examples it is to be understood that the present invention is in no way to be deemed as limited thereto, but should be construed as broadly as all or any equivalents thereof.

I claim:

1. A process for producing heterocyclic derivatives of the formulas:

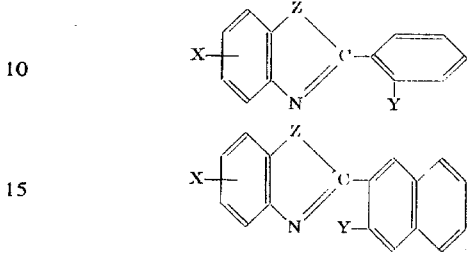

wherein

X is selected from H, lower alkyl, lower alkoxy, and halogen;

Y is selected from OH and X, wherein X is as defined above; and

Z is selected from NH, O, and S, which comprises condensing a compound I selected from the formulas:

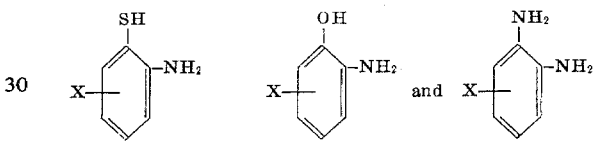

with a compound II selected from the formulas:

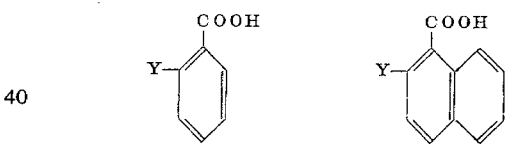

wherein X and Y are defined above, in the presence of a catalyst comprising phosphorus trichloride in an amount of from about 0.5 to about 2.0 mols per mol of compound I and a solvent selected from organic aromatic hydrocarbons, aniline and mono- and di-lower alkyl substituted aniline, said process being conducted in two stages, the first stage being conducted at a temperature of from about 40° to about 80° C to affect the reaction of said compound I with said phosphorus trichloride to form a phosphazo intermediate with the second stage being conducted at a temperature of from about 90° to about 120° C to affect the reaction of said phosphazo intermediate with said Compound II.

2. The process of claim 1 wherein said Compound I is o-aminobenzenethiol, and said Compound II is salicyclic acid, the desired heterocyclic derivative being 2-benzothiazolylphenol.

3. The process of claim 1 wherein said solvent is toluene.

4. The process of claim 1 wherein said solvent is dimethylaniline.

5. The process of claim 2 wherein said solvent is toluene.

6. The process of claim 2 wherein said solvent is dimethylaniline.

* * * * *